US005621756A

United States Patent [19]
Bush et al.

[11] Patent Number: 5,621,756
[45] Date of Patent: Apr. 15, 1997

[54] METHOD SUPER-REGENERATIVE TRANSCEIVER, AND COMPUTER SYSTEM FOR PROVIDING SHORT RANGE COMMUNICATION WITH REDUCED CURRENT DRAIN

[75] Inventors: Harry D. Bush, Palatine; George N. Kotzamanis, Schaumburg; James O. Tomaszewski, Hoffman Estates, all of Ill.

[73] Assignee: Motorola, Inc., Schaumburg, Ill.

[21] Appl. No.: 380,902

[22] Filed: Jan. 30, 1995

[51] Int. Cl.$^6$ ............................... H04B 1/38; H04B 1/16
[52] U.S. Cl. ..................... 375/219; 455/215; 455/336
[58] Field of Search ............................ 375/219; 455/215, 455/336, 38.3, 343; 340/825.44, 311.1; 378/106, 107, 108

[56] References Cited

U.S. PATENT DOCUMENTS 5,251,325  10/1993  Davis et al. ........................ 455/38.3

OTHER PUBLICATIONS

"Super-Regenerative Receivers", J. R. Whitehead, The Syndics of the Cambridge University Press, 1950.

*Primary Examiner*—Stephen Chin
*Assistant Examiner*—Kevim Kim
*Attorney, Agent, or Firm*—Darleen J. Stockley

[57] ABSTRACT

The current invention is a method (100), super-regenerative transceiver (300), and computer system (500) for providing short range communication with reduced current drain. A control unit provides an amplifier "ON" pulse periodically to a radio frequency amplifier to allow reduced current drain. The radio frequency amplifier eliminates antenna effects in an input signal to provide an amplified input signal. The control unit also provides a receiver "ON" pulse to a super-regenerative receiver immediately following the amplifier "ON" pulse to allow reduced current drain. The super-regenerative receiver detects received data given the amplified input signal.

4 Claims, 3 Drawing Sheets

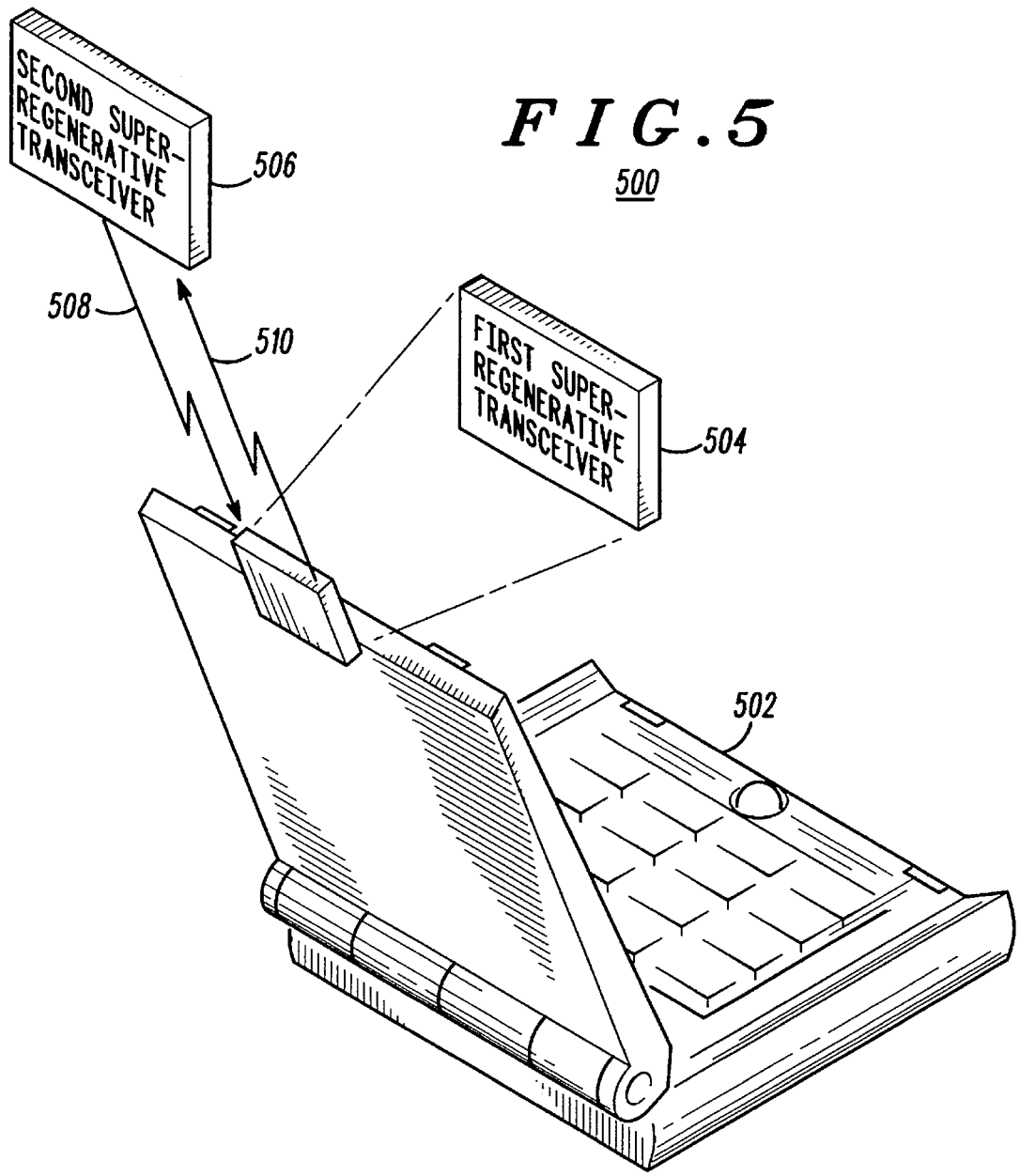

5,621,756

METHOD SUPER-REGENERATIVE TRANSCEIVER, AND COMPUTER SYSTEM FOR PROVIDING SHORT RANGE COMMUNICATION WITH REDUCED CURRENT DRAIN

FIELD OF THE INVENTION

The present invention relates generally to super-regenerative receivers, and more particularly to super-regenerative transceivers with reduced current drain.

BACKGROUND OF THE INVENTION

The super-regenerative receiver was invented by Armstrong in the 1920s. Since then, many systems have been designed using the super-regenerative receiver. The super-regenerative receiver is an oscillator which is periodically allowed to oscillate for a short period of time. The oscillations are started either by a signal or by noise. The amplitude of the oscillation at the end of the short time period is proportional to the amplitude of the signal or noise at the beginning of the short period. The amplitude of the oscillation can be used directly as an indication of the amplitude of the signal, or it can be used to modify the length of the time period or the bias conditions of the oscillator in order to maintain a constant amplitude of the oscillation at the end of the time period. In the latter conditions, a derived voltage is used for the indication of signal amplitude.

Shortly after the super-regenerative receiver became popular, users observed that the oscillations from one receiver affected the reception in other, nearby receivers. This problem could be reduced if the receivers were equipped with a radio frequency amplifier, which amplified the desired signal from the antenna to the super-regenerative stage, and attenuated the oscillations in the reverse direction.

The simplicity and low component count of the super-regenerative receiver are advantages in portable and limited size applications. When portable super-regenerative receiver systems are designed to be powered from a battery, reduced current drain is essential for allowing a longer battery life.

Accordingly, there is a need for a method, super-regenerative transceiver, and communication system for providing short range communication with reduced current drain.

BRIEF DESCRIPTION OF THE DRAWINGS

FIG. 5 is a representation of a communication system comprising at least two super-regenerative transceivers in accordance with the present invention.

DETAILED DESCRIPTION OF A PREFERRED EMBODIMENT

Generally, the present invention provides a method, super-regenerative transceiver, and computer system for providing short range communication with reduced current drain. The present invention provides localized operation in order to allow multiple communication links that do not interfere with one another. In the context of the present invention, short range is defined as 0 to 20 feet. While an embodiment of the invention may operate over a range slightly larger than 20 feet, interference will increase, thus preventing multiple communication links.

Figure 1:
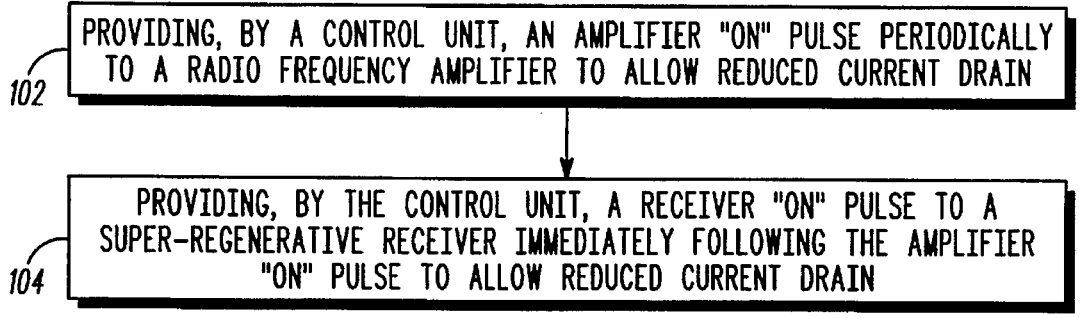
FIG. 1 is a flow diagram of one embodiment of steps for detecting received digital data in a method for providing short range reception with reduced current drain in accordance with the present invention.

FIG. 1, numeral 100, is a flow diagram of one embodiment of steps for detecting received digital data in a method for providing short range reception with reduced current drain in accordance with the present invention. The first step is providing, by a control unit, an amplifier "ON" pulse periodically to a radio frequency amplifier to allow reduced current drain (102). Use of a radio frequency amplifier between an antenna and a super-regenerative receiver is well known in the art. The radio frequency amplifier amplifies a desired signal from the antenna and eliminates antenna effects by providing an isolation between the antenna and the super-regenerative receiver. The next step is providing, by the control unit, a receiver "ON" pulse to the super-regenerative receiver immediately following the amplifier "ON" pulse to allow reduced current drain (104). The super-regenerative receiver detects received data given the amplified input signal.

Figure 2:
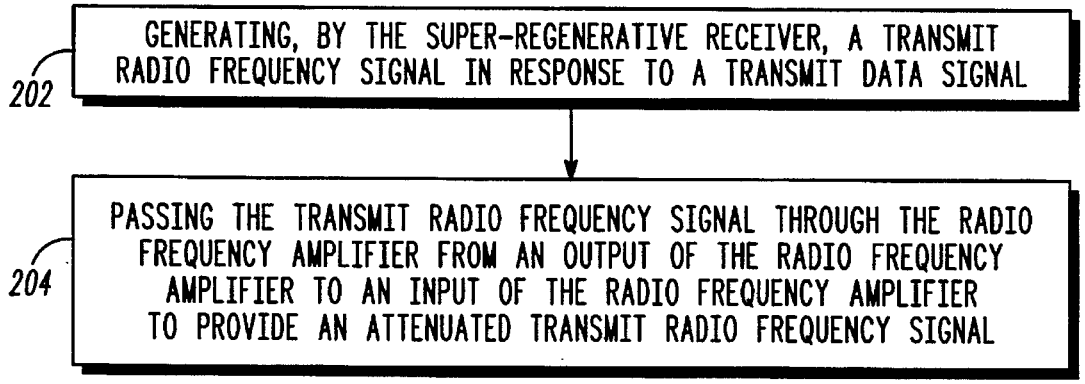
FIG. 2 is a flow diagram of one embodiment of steps for transmitting digital data in a method for providing short range transmission with reduced current drain in accordance with the present invention.

FIG. 2, numeral 200, is a flow diagram of one embodiment of steps for transmitting transmit data in a method for providing short range transmission with reduced current drain in accordance with the present invention. The first step is generating, by the super-regenerative receiver, a transmit radio frequency signal in response to a transmit data signal (202). The second step is passing the transmit radio frequency signal through the radio frequency amplifier from an output of the radio frequency amplifier to an input of the radio frequency amplifier to provide an attenuated transmit radio frequency signal (204).

Figure 3:
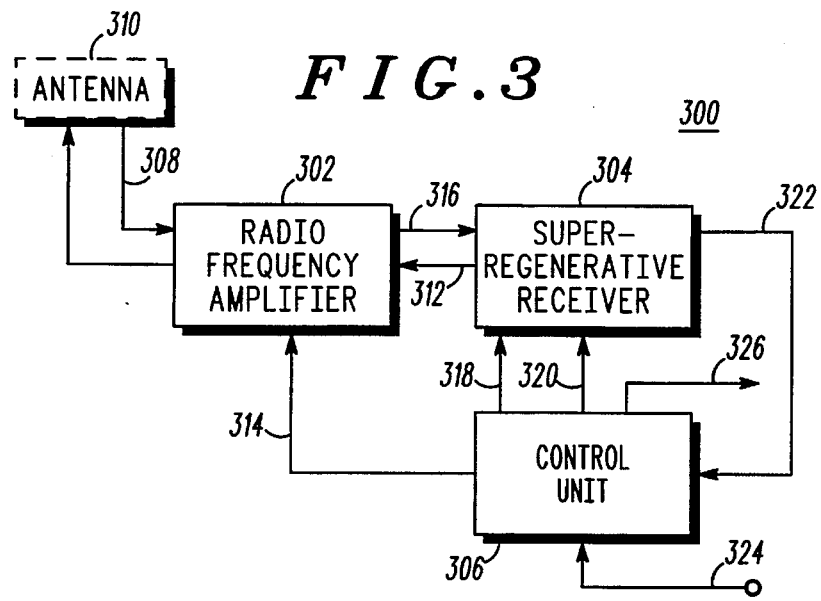
FIG. 3 is a block diagram of a super-regenerative transceiver for providing short range communication with reduced current drain in accordance with the present invention.

FIG. 3, numeral 300, is a block diagram of a super-regenerative transceiver for providing short range communication with reduced current drain in accordance with the present invention. The super-regenerative transceiver comprises a radio frequency amplifier (302), a super-regenerative receiver (304), and a control unit (306).

The radio frequency amplifier (302) is operably coupled to receive an input signal (308) from an antenna (310), a transmit radio frequency signal (312) from the super-regenerative receiver (304), and an amplifier "ON" pulse (314) from the control unit (306). In the receive mode the radio frequency amplifier (302) eliminates antenna effects in the input signal (308) to provide an amplified input signal (316) during the amplifier "ON" pulse (314). In the transmit mode, the radio frequency amplifier (302) transmits the transmit radio frequency signal (312) from the super-regenerative receiver (304) to the antenna (310).

The super-regenerative receiver (304) is operably coupled to receive the amplified input signal (316) from the radio frequency amplifier (302), a transmit data signal (318) from the control unit (306), and a receiver "ON" pulse (320) from the control unit (306). In the receive mode, the super-regenerative receiver (304) provides a receiver output (322) during the receiver "ON" pulse (320). In the transmit mode, the super-regenerative receiver (304) provides the transmit radio frequency signal (312) in response to the transmit data signal (318).

The control unit (306) is operably coupled to receive the receiver output (322) from the super-regenerative receiver (304) and a data in signal (324). The control unit (306) determines the operational mode based on the data input signal (324). If a timer within the control unit (306) is timed out, the first pulse on the data input (324) restarts the timer and causes the receiver (304) to operate until the timer expires. Additional pulses before the timer expiration result in the super-regenerative stage oscillating at full power during each pulse and the data being transmitted through the radio frequency amplifier (302).

While the timer within the control unit (306) is operating, The control unit generates "ON" pulses for the RF stage and the super-regenerative stage of the receiver. With no input signal at the antenna (310), the receiver "ON" pulse is adjusted in size until the rectified signal from the super-regenerative stage reaches a predetermined value. When a signal is received, there is an increase in the size of the rectified signal from the super-regenerative stage. This is stored in a capacitor and is used to reduce the size of the receiver "ON" pulse within the receiver. The receiver output (322) is a buffered equivalent of the rectified signal which is latched within the control unit (306) and is supplied to the output (326).

Figure 4:
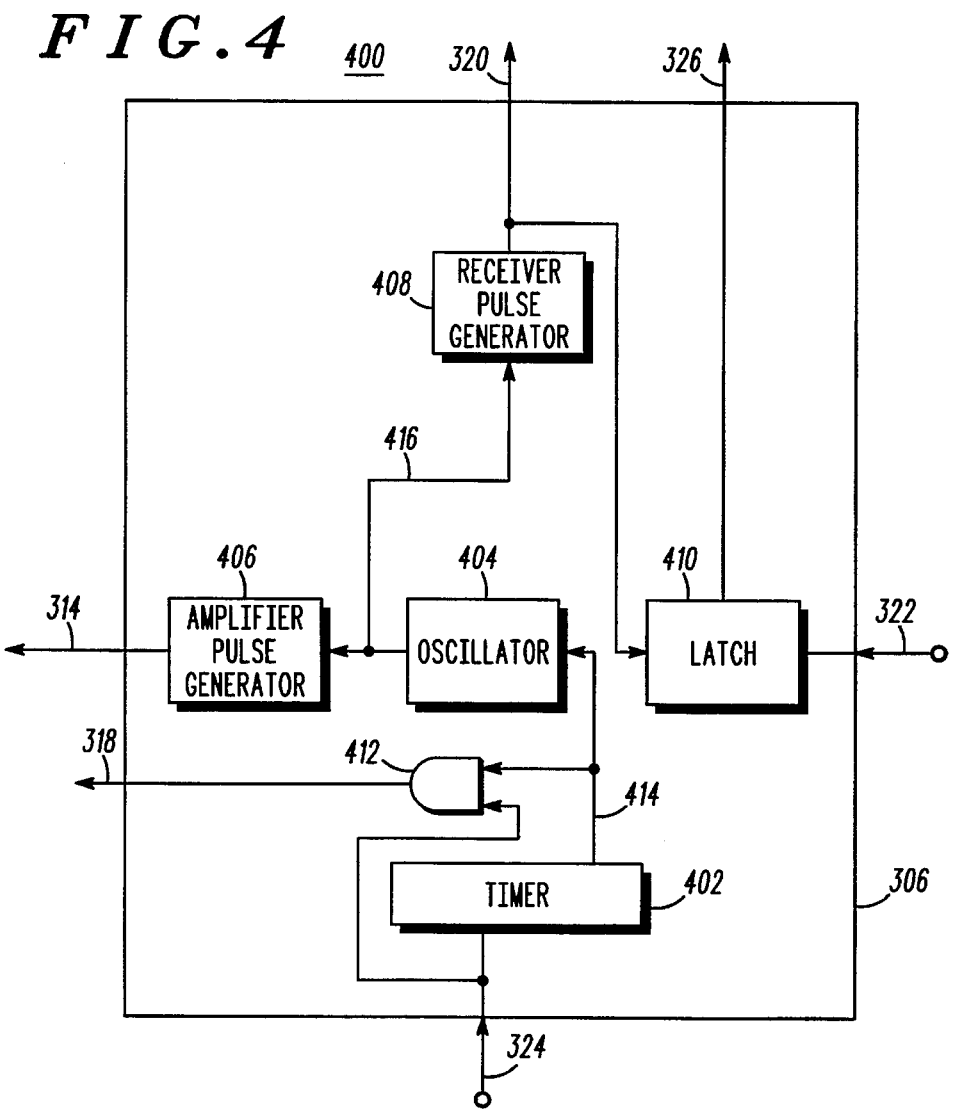
FIG. 4 is a block diagram of a control unit from FIG. 3, shown in greater detail, in accordance with the present invention.

FIG. 4, numeral 400, is a more detailed block diagram of the control unit from FIG. 3 in accordance with the present invention. The control unit (306) comprises a timer (402), an oscillator (404), an amplifier pulse generator (406), a receiver pulse generator (408), a latch (410), and a gate (412).

The timer (402) is operably coupled to receive the data in signal (324) and provide a timer signal which initiates the oscillator. The timer (402) is reset by a pulse on the data in signal (324). The oscillator is operably coupled to the timer and provides a square wave (416). The amplifier pulse generator (406) and the receiver pulse generator (408) receive the square wave and generate the amplifier "ON" pulse (314) and the receiver "ON" pulse (320) respectively. The amplifier "ON" pulse (314) and receiver "ON" pulse (320) may be generated on both the rising and falling edges of the oscillator (404) thereby reducing the current required by the oscillator (404). The latch (410) receives the receiver "ON" pulse (320) and holds the receiver output (322) to produce the data out signal (326). The gate (412) receives the timer signal (414) and the data in line (324) for providing the transmit data signal (318).

FIG. 5, numeral 500, is a representation of a computer (502) communication system comprising at least two super-regenerative transceivers (504 and 506) in accordance with the present invention. Periodically, the computer pulses the data in line (324) to start the receiver. If no signal is received, the receiver stops after a predetermined time. If a signal (508) is received, the received data is forwarded to the computer via the latched data line (326). The computer then communicates (510) with the equipment, usually a second computer, connected to the second receiver, following a predetermined protocol.

The present invention may operate in the 3 to 6 GHz frequency range. During continuous operation, as in communicating with another unit, the receiving mode typically requires about 450 microamperes and the transmitting mode requires an average of 4.5 milliamperes for amplitude shift keying, ASK. In the periodic listen, battery saver, mode, the receiver generally requires about 4 microamperes with a duty cycle of 8 milliseconds per second.

The receiver is purposely widened to assure reception of any transmission where the transmitter is at any temperature within the desired range. This reduces the sensitivity of the receiver to about −65 dBm. The transmitter, attenuated through the RF amplifier stage, delivers −12 dBm to the antenna. Maximum consistent range, which is defined by a 20 dB signal-to-noise ratio, is about twenty feet.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for providing short range communication with reduced current drain, the method comprising detecting received data by:

providing, by a control unit, an amplifier "ON" pulse periodically to a radio frequency amplifier to allow reduced current drain, wherein the radio frequency amplifier eliminates antenna effects in an input signal to provide an amplified input signal; and providing, by the control unit, a receiver "ON" pulse to a super-regenerative receiver immediately following the amplifier "ON" pulse to allow reduced current drain, Wherein the super-regenerative receiver detects received data given the amplified input signal, wherein the method further comprises providing data transmission by:

generating, by the super-regenerative receiver, a transmit radio frequency signal in response to a transmit data signal; and passing the transmit radio frequency signal through the radio frequency amplifier from an output of the radio frequency amplifier to an input of the radio frequency amplifier to provide an attenuated transmit radio frequency signal.

2. A super-regenerative transceiver for providing short range communication with reduced current drain, wherein the short range communication comprises a transmit mode and a receive mode, the super-regenerative transceiver comprising:

a radio frequency amplifier, operably coupled to receive an input signal from an antenna, a transmit radio frequency signal from a super-regenerative receiver, and an amplifier "ON" pulse from a control unit, for, in the receive mode, eliminating antenna effects in the input signal to provide an amplified input signal during the amplifier "ON" pulse and for, in the transmit mode, transmitting the transmit radio frequency signal from the super-regenerative receiver to the antenna;

the super-regenerative receiver, operably coupled to receive the amplified input signal from the radio frequency amplifier, a transmit data signal from the control unit, and a receiver "ON" pulse from the control unit, for, in the receive mode, providing a receiver output during the receiver "ON" pulse and for, in the transmit mode, providing the transmit radio frequency signal in response to the transmit data signal; and the control unit, operably coupled to receive the receiver output from the super-regenerative receiver and a data in signal, for determining the receive mode based on the receiver output from the super-regenerative receiver, for passing the data in signal to the super-regenerative receiver in the form of the transmit data signal, and for periodically providing the amplifier "ON" pulse and the receiver "ON" pulse in the receive mode to reduce current drain of the super-regenerative transceiver, wherein the receiver "ON" pulse is used to provide a data out signal.

3. The super-regenerative transceiver of claim 2, wherein the control unit further comprises:

a timer, operably coupled to receive the data in signal, for providing a timer signal which initiates an oscillator;

the oscillator, operably coupled to the timer, for providing a square wave;

an amplifier pulse generator, operably coupled to receive the square wave, for generating the amplifier "ON" pulse;

a receiver pulse generator, operably coupled to receive the square wave, for generating the receiver "ON" pulse;

a latch, operably coupled to receive the receiver "ON" pulse and the receiver output, for providing the data out signal; and a gate, operably coupled to receive the timer signal and the data in line, for providing the transmit data signal.

4. A computer system comprising at least two super-regenerative transceivers for providing short range communication with reduced current drain, wherein the short range communication comprises a transmit mode and a receive mode, each super-regenerative transceiver comprising:

a radio frequency amplifier, operably coupled to receive an input signal from an antenna, a transmit radio frequency signal from a super-regenerative receiver, and an amplifier "ON" pulse from a control unit, for, in the receive mode, eliminating antenna effects in the input signal to provide an amplified input signal during the amplifier "ON" pulse and for, in the transmit mode, transmitting the transmit radio frequency signal from the super-regenerative receiver to the antenna;

the super-regenerative receiver, operably coupled to receive the amplified input signal from the radio frequency amplifier, a transmit data signal from the control unit, and a receiver "ON" pulse from the control unit, for, in the receive mode, providing a receiver output during the receiver "ON" pulse and for, in the transmit mode, providing the transmit radio frequency signal in response to the transmit data signal; and the control unit, operably coupled to receive the receiver output from the super-regenerative receiver and a data in signal, for determining the receive mode based on the receiver output from the super-regenerative receiver, for passing the data in signal to the super-regenerative receiver in the form of the transmit data signal, and for periodically providing the amplifier "ON" pulse and the receiver "ON" pulse in the receive mode to reduce current drain of the super-regenerative transceiver, wherein the receiver "ON" pulse is used to provide a data out signal.

* * * * *